May 5, 1942.　　P. HARROWER ET AL　　2,282,184
MANUFACTURE OF HYDROGEN PEROXIDE
Filed Feb. 27, 1940
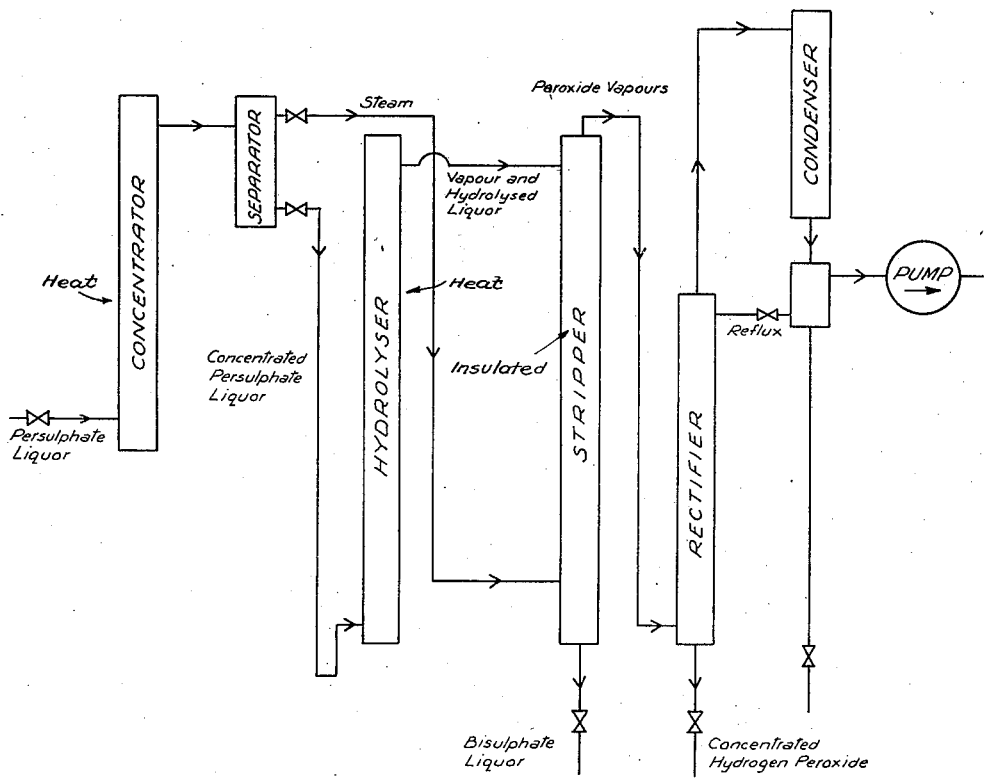
INVENTORS
P. HARROWER
R.C. COOPER
O.H. WALTERS
BY W.P. McElroy
ATTORNEY Patented May 5, 1942

2,282,184

UNITED STATES PATENT OFFICE 2,282,184

MANUFACTURE OF HYDROGEN PEROXIDE

Peter Harrower, Robert Christian Cooper, and Oswald Hugh Walters, Runcorn, England, assignors to Imperial Chemical Industries Limited, a corporation of Great Britain Application February 27, 1940, Serial No. 321,136
In Great Britain January 6, 1939

2 Claims. (Cl. 23—207)

This invention relates to improvements in the manufacture of hydrogen peroxide.

It is known to manufacture hydrogen peroxide by hydrolysing and distilling solutions of persulphates or persulphuric acid, e. g. such as may be obtained by the anodic oxidation of aqueous solutions of the corresponding sulphate or sulphuric acid. During the hydrolysis and distillation, losses are liable to occur through unwanted decomposition of the percompounds in amounts depending on the conditions under which the hydrogen peroxide is recovered, and various modifications in procedure have been proposed with the object of minimizing such losses. For example, it has been proposed to perform the concentration of the persulphate or persulphuric acid solution under reduced pressure until not more than half the persulphate or persulphuric acid is hydrolysed, and then to complete the hydrolysis substantially without further evaporation of water, in the presence of added water or steam. It has also been proposed to conduct the distillation in two or more stages, with intermediate dilution of the remaining liquor by the addition of water or steam, prior to the second or subsequent distillation stage. In carrying out these distillations it is customary to collect together all the vapours and to obtain a concentrated product by fractionating them. This, of course, entails a consumption of energy which could be lessened if it were possible to obtain vapours more concentrated in hydrogen peroxide for delivery to the fractionating column.

A further advantage of obtaining concentrated hydrogen peroxide vapours is that the dimensions of the fractionating column and final condenser can then be appreciably reduced,—an important point where glass or ceramic materials are used for their fabrication.

When solutions such as those obtained from the anodic oxidation of aqueous solutions of soluble sulphates or sulphuric acid are distilled under reduced pressure, there is evolved initially a considerable quantity of steam containing substantially no hydrogen peroxide, and we have found that this fact can be utilized to provide a process in which a more concentrated vapour is available for delivery to the fractionating column or other device for preparing high strength hydrogen peroxide. In consequence of this it is possible to work with a much smaller fractionating column, and frequently a simple rectifier can be employed where otherwise a compound fractionating column would be necessary.

According to the present invention these objects are attained by concentrating the dilute solution of persulphate or of persulphuric acid under reduced pressure up to the stage where further concentration causes hydrogen peroxide to be vaporised, separating the steam formed thereby, and recovering hydrogen peroxide from the concentrated liquor by distillation. In a preferred form of our invention the steam evolved in the first stage of our process, if desired after superheating it, is used in the recovery of hydrogen peroxide by contacting it with the concentrated liquor at a subsequent stage in the process. Suitable pressures under which our process may be operated are those between 40 and 120 mm. of mercury, e. g. at 60 mm.

The extent to which the initial concentration can be effected will vary with the composition of the liquor to be treated. Obviously with dilute solutions concentration can be carried further than with more concentrated ones. We also find that a greater initial concentration is possible in a liquid which is but weakly acid. Thus, for example, when concentrating under reduced pressure a liquor containing 200 grams per litre of ammonium persulphate and 190 grams per litre of sulphuric acid, it was possible to distil off water amounting to 40 per cent by weight of the liquor without vaporizing as hydrogen peroxide more than 0.2 per cent of the available oxygen content of the feed liquor, while with a liquor containing 200 grams per litre of ammonium persulphate and 239 grams per litre of sulphuric acid only water corresponding to 22 per cent of the liquor could be distilled off without vaporizing a similar proportion of hydrogen peroxide. In general we prefer to employ in our invention a liquor containing not more than 190 grams per litre of sulphuric acid.

In one form of our invention the treatment of the concentrated liquor is carried out in two further stages, in the first of which at least the major portion, e. g. 80 to 90 per cent of the hydrolysis of the percompound is effected, some hydrogen peroxide, and more water is evaporated, while in the second the hydrolysis is completed and the remaining hydrogen peroxide in the liquor is vaporized substantially without further concentration by adding water or steam prior to or during the distillation. Advantageously we use in the distillation stage the steam evolved in the preliminary concentration stage. A proportion of the hydrogen peroxide will be vaporized during the hydrolysis stage, and the vapour thus formed can be collected separately, or the vapours from the last two stages can be collected together and delivered to a fractionating column or worked up in any other suitable manner. Suitably, all three stages in the process are carried out at the same reduced pressure, but if desired the subsequent stages may be carried out under lower or higher pressure than the first stage.

In carrying out this form of the invention a solution of the percompound, e. g. an acid solution of ammonium persulphate obtained by the anodic oxidation of an acid ammonium sulphate solution, is passed through a vertical steam heated tube, or bank of tubes, at such a rate that while substantially no hydrogen peroxide is evolved, further concentration of the effluent liquor would result in the evolution of hydrogen peroxide; this rate can readily be determined experimentally by analysing the vapours evolved with various rates of flow. Thus for the case previously quoted of a liquor containing 200 grams per litre of ammonium persulphate and 190 grams per litre of sulphuric acid, it would be possible to use a rate of feed such that 40 per cent of the feed liquor was evaporated.

From the tubes the solution passes through a liquid seal into a second similar set of tubes, while the steam is diverted to the apparatus in which is carried out the third stage to be subsequently described. In the second set of tubes hydrolysis of the persulphate is carried almost to completion, e. g. to 90 to 95 per cent completion, and some 30 to 40 per cent of the hydrogen peroxide will be vaporized together with more water, giving, however, vapours containing a higher concentration of hydrogen peroxide than would have been obtained if the preliminary stage had been omitted, since the steam initially evolved has been separately collected. The solution is finally delivered to the upper part of a packed or unpacked vertical column to the lower part of which the steam from the first stage is delivered, and which is surrounded by a hot water jacket or a steam jacket. Solution and steam thus flow counter-current through the column and the last of the hydrogen peroxide is vaporized. The liquid leaving the tube comprises only an acid bisulphate solution which may, if desired, be again submitted to electrolysis to manufacture further quantities of persulphate, while the vapours from the second and third stages are collected and concentrated in a fractionating column.

If, as is advantageous, all the stages are carried out at the same reduced pressure, the collection of the vapours from the second and third stages will be merely a matter of joining the vapour exit for each stage to a common main, and the diversion of steam from the first stage to the third merely a matter of joining the exit for the steam from the first stage to the inlet at the lower part of the column in which the final stripping is carried out. Where successive stages are carried out at different pressures, the appropriate pressure can be maintained in each section of the apparatus by providing reducing valves in the vapour and liquid conduits.

It will be appreciated that many modifications in our invention are possible; for example, in the above process the vertical tube systems of the first and second stages may be replaced by horizontal or inclined tubes, or by apparatus of the film evaporator type. Again, additional steam may be delivered to the lower part of the stripping section, though in order that the hydrogen peroxide-containing vapours may be as concentrated as possible we prefer not to use more than is necessary to ensure satisfactory stripping. In yet another modification of our invention a pump or a superheater or both may be provided in the line delivering steam from the first stage to the third stage.

The following example illustrates but does not limit our invention, all parts being by weight.

*Example*

An acid ammonium persulphate liquor obtained by the electrolytic oxidation of an acidified ammonium bisulphate liquor and containing 200 grams per litre of ammonium persulphate and 190 grams per litre of sulphuric acid, was fed at the rate of 100 parts per hour to a set of vertical steam heated tubes, whereby 40 parts per hour of water vapour were evolved containing substantially no hydrogen peroxide.

The liquor was then passed through a liquid seal into a second set of vertical steam heated tubes and the steam was delivered via a superheater to the base of the stripper referred to subsequently. In the second set of tubes the extent of the hydrolysis of the persulphate was increased to 90 per cent, and 40 per cent of the hydrogen peroxide theoretically obtainable from the liquor was vaporized, together with further quantities of water. The liquor was then delivered to a stripper column down which it was passed in counter-current to the steam evolved in the first stage, whereby the remainder of the persulphate was hydrolyzed and a further 55 per cent of the hydrogen peroxide was vaporized. The vapours from the stripper and the second stage were collected together and gave a vapour containing 3.6 per cent hydrogen peroxide which was fractionated in a simple fractionating column to give a 100 volume solution of hydrogen peroxide. The whole apparatus was maintained at a reduced pressure of 60 mm. of mercury.

In the accompanying drawing there is illustrated, in the manner of a flow sheet, a typical mode of carrying out the invention. Persulphate liquor is fed to a heated concentrator, wherein hydrolysis takes place, together with concentration, and thence to a separator, whence the concentrated liquor is passed to a hydrolyser, wherein hydrolysis takes place. The hydrolysed liquor and the vapours ($H_2O$ and $H_2O_2$) are passed to a stripper, to which steam is supplied from the separator. The vapours from this zone are sent to a rectifier from which relatively concentrated hydrogen peroxide is recovered, while spent hydrolysed liquor freed of $H_2O_2$ is drawn off from the stripper. A vacuum pump maintains the proper degree of subatmospheric pressure throughout the system.

We claim:

1. A method of manufacturing hydrogen peroxide by distillation of acidified solutions of a persulphate which comprises continuously concentrating such a solution with the production of water vapors substantially free from hydrogen peroxide, separately heating the concentrated solution to effect hydrolysis thereof and with the production of water vapors containing a substantial concentration of hydrogen peroxide, and then contacting the concentrated and hydrolyzed solution with said first-mentioned water vapors to effect further removal of hydrogen peroxide without further concentration of said solution, the entire operation being conducted under subatmospheric pressure.

2. A process for the manufacture of hydrogen peroxide which comprises subjecting a dilute aqueous solution containing a compound selected from the class consisting of alkali metal and ammonium persulphates and persulphuric acid to heat in a preliminary concentrating zone under subatmospheric pressure to evaporate $H_2O$ vapor therefrom, concentration being carried up to a point where further concentration would be accompanied with extensive hydrolysis of said compound and would cause hydrogen peroxide to be evolved, removing the $H_2O$ vapors, substantially free of hydrogen peroxide, from contact with the solution, delivering the concentrated solution to a separate hydrolyzing zone and there heating it under conditions causing hydrolysis of the major part of the compound, with evolution of $H_2O$ vapors containing hydrogen peroxide, then passing the solution to a separate distillation zone and there subjecting the solution to convection distillation in the presence of steam evolved in the preliminary concentrating step to strip hydrogen peroxide from the solution without further concentration, recovering hydrogen peroxide from the combined vapors evolved in said hydrolyzing and distillation zones.

PETER HARROWER.
ROBERT CHRISTIAN COOPER.
OSWALD HUGH WALTERS.